United States Patent [19]

Raymond et al.

[11] Patent Number: 5,048,260
[45] Date of Patent: Sep. 17, 1991

[54] INDUCTION SEALING MACHINE AND PACKAGE WRAPPER USEFUL THEREWITH

[75] Inventors: Susan L. Raymond, Palos Hills; Kevin M. Fistek, Burbank, both of Ill.

[73] Assignee: Wm. Wrigley, Jr. Company, Chicago, Ill.

[21] Appl. No.: 422,929

[22] Filed: Oct. 17, 1989

[51] Int. Cl.$^5$ ............................................. B65B 51/18
[52] U.S. Cl. ................................. 53/370.8; 53/371.3; 53/376.7; 53/387.3; 156/379.7; 219/10.53
[58] Field of Search ................ 53/DIG. 2, 375, 373, 53/379, 388, 370.8, 371.3, 373.8, 374.3, 376.7, 387.3; 156/27.2, 27.4, 379.7, 583.5, 583.7; 219/10.53, 10.69, 10.71

[56] References Cited

U.S. PATENT DOCUMENTS

| | | | |
|---|---|---|---|
| 2,723,517 | 11/1955 | Mittelmann | 53/DIG. 2 X |
| 3,027,443 | 3/1962 | Reed et al. | 219/10.53 |
| 3,166,462 | 1/1965 | Schoder . | |
| 3,315,439 | 4/1967 | Pierre | 53/388 |
| 3,730,804 | 5/1973 | Dickey . | |
| 3,864,186 | 2/1975 | Balla . | |
| 3,879,247 | 4/1975 | Dickey . | |
| 3,909,326 | 9/1975 | Renck | 53/410 X |
| 4,095,390 | 6/1978 | Knudsen | 53/314 X |
| 4,180,961 | 1/1980 | Collins, III | 53/478 X |
| 4,237,360 | 12/1980 | Pohlenz . | |
| 4,248,653 | 2/1981 | Gerber . | |
| 4,264,316 | 4/1981 | Knudsen . | |
| 4,539,456 | 9/1985 | Mohr | 219/10.69 |
| 4,637,199 | 1/1987 | Steck et al. . | |
| 4,707,213 | 11/1987 | Mohr et al. | 53/373 X |

OTHER PUBLICATIONS

Kresnosky, "Improving the Induction Sealing Process Through Sealing Coiling Design", Apr. 1987; pp. 42–45.

Primary Examiner—John Sipos
Attorney, Agent, or Firm—Willian Brinks Olds Hofer Gilson & Lione

[57] ABSTRACT

An apparatus for induction-sealing a package having sides formed of overlaying flaps with a thermoplastic material between the flaps serving as the adhesive has independently adjustable platens that bear against counter-rotating conveyor belts for applying varying pressure to the package sides to be sealed. A special package wrapper is also disclosed which is formed of a laminate having the thermoplastic material printed on a layer of printing ink. When heated, the thermoplastic material seeps through the ink to bond with a polyolefin layer below and thereby seals overlying package flaps together.

9 Claims, 4 Drawing Sheets

INDUCTION SEALING MACHINE AND PACKAGE WRAPPER USEFUL THEREWITH

FIELD OF THE INVENTION

This invention is generally related to the sealing of a package or other container, as well as a wrapper for use in making the package. It more specifically relates to an apparatus for sealing a package having sides formed by overlying flaps which are adhered to each other by inductive heating, and a special wrapper particularly adapted for making an inductively-sealed package for a stack of chewing gum sticks.

BACKGROUND OF THE INVENTION

The principles of induction sealing packages or other containers are well known. See, for instance, U.S. Pat. Nos. 3,864,186 and 3,730,804. As an example, induction sealing is commonly used to seal caps onto polyethylene bottles, such as are used in the food and pharmaceutical industries. Such capseals might have an upper layer of paper, an intermediate aluminum foil layer and an inner layer of a thermoplastic polyolefin, such as polypropylene, polyethylene, etc. The capseal is placed onto the bottle with the polymer layer in facial contact, and covering, the lip of the bottle. The bottle lip is formed of a compatible polymer to the capseal polymer layer.

An electric generator is used with a coil to produce a high-frequency electromagnetic field adjacent the coil. The bottlemouth with capseal thereon is passed through this field, with heat-producing eddy currents thereby being induced in the foil layer of the capseal. This heat is conducted to the polymer layers in a sufficient degree to cause the respective thermoplastic materials to fuse, sealing the bottle.

As will be seen in the disclosure that follows, the present invention came about in an endeavor to make an inductively-sealed package for a stack of chewing gum sticks. These chewing gum packages are formed by a planar wrapper which is folded about the rectangular-shaped stack. The mid-line of the package (where the "ends" of the wrapper meet) is first formed by sealing overlapping wrapper portions along the length of the stack. The two opposite sides of the package thereby left open are then closed by folding the wrapper upon itself and sealing the folded portions. This wrapping technique is, in substance, the typically same employed by anyone who has ever wrapped a gift package.

Considerations in inductive sealing of such a chewing gum package included making a wrapper that could be inductively sealed to itself, met regulations governing packaging of such foodstuffs, and which could be readily produced in massive quantities. The induction sealing apparatus itself also needed to be capable of conveying a pre-folded wrapped gum package, compressing the folded sides of the package into facial engagement, and generating heat-producing eddy currents in the wrapper sufficient to cause induction sealing but not adversely affecting the chewing gum. In this latter regard, it will be borne in mind that each stick of gum also has a wrapper including a foil layer susceptible to inductive heating. A very localized electromagnetic field was therefore required to prevent undesired heating of the gum sticks, but still seal the package sides.

SUMMARY OF THE INVENTION

The present invention comprises an apparatus for sealing a package side or sides, wherein each side has portions folded upon each other with a thermoplastic material between overlapping folded portions. A conveyor is provided for conveying the package along a path with each side of the package to be sealed facing perpendicular to the path of travel. For example, in the context of a package for chewing gum, opposite sides of the package would face laterally to the conveyor path.

The conveyor includes a pair of counter-rotating belts on opposite sides of the path of travel which contact each side of the package to be sealed. The package is thereby held and compressed between the belts.

While the apparatus may be adapted for use with other means for heating, it is particularly adapted for use with an induction heating device. This induction heating device generates heat-producing eddy currents in a metallic layer sufficient to cause the thermoplastic material of the folded portions to become flowable, adhering the overlapped folded portions together.

The induction heating device includes an induction coil having a portion located adjacent the path of travel in opposed relationship to each side to be sealed. Each side to be sealed passes closely by an induction coil portion, and the electromagnetic field generated adjacent the coil causes an induction sensitive material associated with a package side to be sealed heated to a sufficient degree to render the thermoplastic material to become flowable.

Pressure is applied by a belt-biasing device to at least one of the belts along the portion of the path of travel where the thermoplastic material becomes flowable, to press the overlapped portions together. The belt-biasing device includes a member which is not susceptible to the eddy currents generated by the induction heater. This member is furthermore located between the belt and the induction coil. An adjustable biasing element is provided for urging the member against the belt to apply a desired pressure on the belt, to effect a desired pressure of the belt against the package side or sides to be sealed.

In one embodiment, the apparatus applies pressure to each belt through the use of a pair of platen members which are not susceptible to the eddy currents. The platen members are located in opposed relation on respective sides of the path of travel. Again, each platen member is situated between its belt and associated induction coil portion. A head portion to each platen member has a pressure face which engages the belt, a hollow located behind the face within which the induction coil is received, and a body portion extending from the head portion. In this embodiment, the platen member is a T-shape, with the top of the T having the pressure face and the trunk of the T being the body portion.

The body portion is pivotably mounted to permit the head portion to move toward and away from the belt. The adjustable biasing element comprises a spring mounted to bias the body portion toward the belt.

In a presently preferred form, first and second pairs of opposed platen members are located along the path of travel, with each platen member being situated between a belt and the induction coil. The first and second pairs of platen members are located next to one another, and in the area of the path of travel where induction heating occurs.

A third pair of platen members is located upstream from the first and second pairs of platen members, along a portion of the path of travel where the package will not be significantly affected by induction heating. The platen members of the third pair are opposed on respective sides of the path of travel.

A fourth pair of platen members is located downstream from the first and second pairs of platen members, along a portion of the path of travel where the package will not be significantly affected by induction heating. The platen members of this fourth pair are similar to the third pair, being opposed on respective sides of the path of travel.

It will be noted in this embodiment that only the first and second pairs of platen members include a hollow within which a portion of an induction heating coil is received. The third and fourth pairs, being located upstream and downstream from the coils, do not require such hollows.

Each of the foregoing platen members has an adjustable biasing element associated with it for urging the pressure face of the member against the belt to apply a desired pressure on the belt, to thereby affect a desired pressure of the belt against the package sides to be sealed. Accordingly, each pair of platen members can be independently adjusted to effect desired pressures on the sides to be sealed before, during and after heating of the thermoplastic material.

The invention further includes a special wrapper for use in forming an induction-sealed package for a plurality of chewing gum sticks organized into a stack. In a preferred embodiment, this wrapper comprises a laminate having the following layers, which, for ease of description, are described inboard to outboard relative to the stack to be wrapped (i.e., the initial layer is next to the stack), a layer of metal foil susceptible to resistance heating under the influence of inductively produced eddy currents; a first polyolefin layer, such as polyethylene; a layer of paper; a second polyolefin layer, such as polypropylene; printing ink on the second polyolefin layer; and a thermoplastic material, such as a lacquer, which becomes a flowable adhesive upon sufficient heating conducted from induction-heating of the metal foil layer.

The foregoing wrapper is folded about the stack in a manner whereby portions of the thermoplastic, or adhesive, layer overlie each other in facial engagement on opposite sides of the package. These are the same sides sealed by the apparatus previously described. Upon induction heating, the thermoplastic material becomes flowable and seeps through the printing ink to bond with the underlying polypropylene layer. The overlapped layers of thermoplastic material also bond with each other. Under pressure from the aforementioned apparatus, an effective seal of the package sides is made.

It will be noted that this bonding occurs without disturbing the printing ink layer. A presently preferred embodiment of the special wrapper utilizes a counterband of lacquer which is applied, via printing, over the printing ink along just those portions of a wrapper web which will become the side edges (to be sealed) of individual wrappers, when the web is cut. A "prelaminated" wrapper is thereby readily mass-produced in rolls in an efficient and cost-effective manner.

The features and advantages of the present invention will be further understood upon consideration of the following detailed description of an embodiment of the invention taken in conjunction with the drawings, in which:

DETAILED DESCRIPTION OF AN EMBODIMENT OF THE INVENTION

The present invention has been developed for specific use in the packaging of stacks of chewing gum sticks. It is described hereafter in that environment. It will nonetheless be understood and appreciated that the invention is not necessarily limited to just the packaging of gum, but may find use in other applications. So too, although induction heating is the preferred method of heating the adhesive material of the package sides to be sealed, other means for heating may fall within the scope of the invention in its broadest expression.

Figure 1:
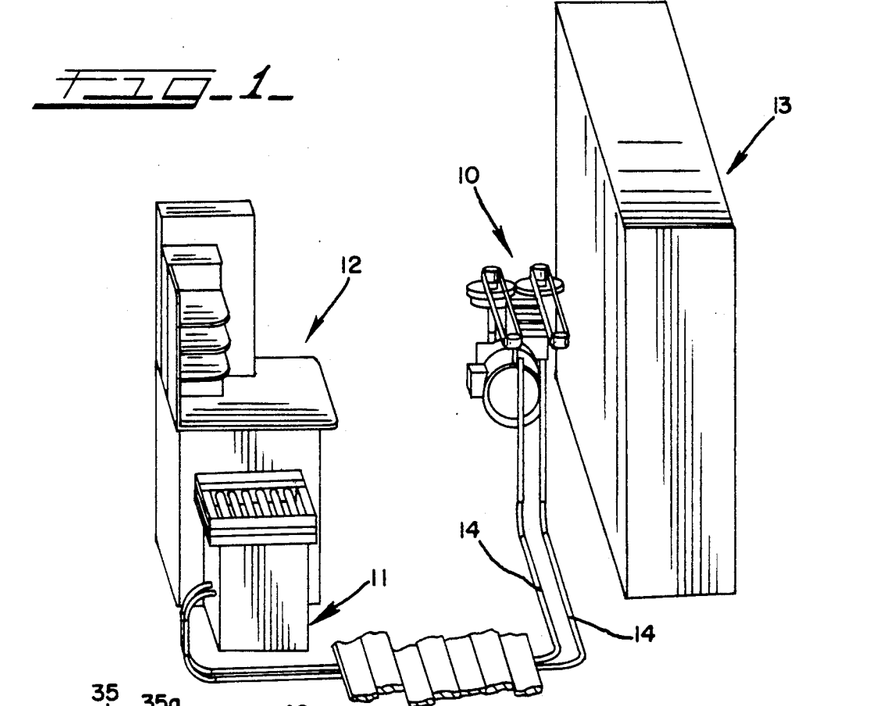
FIG. 1 is perspective view, somewhat schematic, of a packaging assembly including an apparatus for sealing a package made in accordance with the teachings of the present invention.

Turning now to the drawings, FIG. 1 illustrates an assembly for packaging stacks of chewing gum sticks. This assembly includes an induction sealing and conveyor unit generally indicated at 10, an electric generator 11, a water recirculator 12 and a wrapping machine 13. The generator 11 provides a high-frequency alternating current to a coil 20 in the induction sealing and conveyor unit 10 (described in greater detail hereafter), to generate an alternating electromagnetic field adjacent the coil. The generator 11, including its associated water recirculator 12 for cooling the induction coil, is standard equipment well known to the art. The generator, coil and recirculator were obtained from Lepel Corp of Edgewood, N.Y. The output frequency range generated is between 160 and 800 KHz, and is preferably around 200–450 KHz in the present embodiment. Leads 14 carry water coolant and current to the induction coil.

FIG. 1 is a conceptual arrangement of an installation incorporating the present invention. Sheets of gum are removed from the conditioning room and delivered to the wrapping machine 13 which automatically performs a number of operations. First, it separates the individual sticks. Then it transfers the sticks to an aluminum foil/paper laminate strip. This laminated material is wrapped around the stick, which is then wrapped in a printed band. The wrapped sticks are automatically accumulated and overwrapped with a material (to be described with more particularity hereafter) which includes a tear ribbon to permit easy opening of the package. As the overwrapped sticks are conveyed towards a box-filling machine, both ends of the package are folded and firmly sealed, as disclosed herein.

Figure 2:
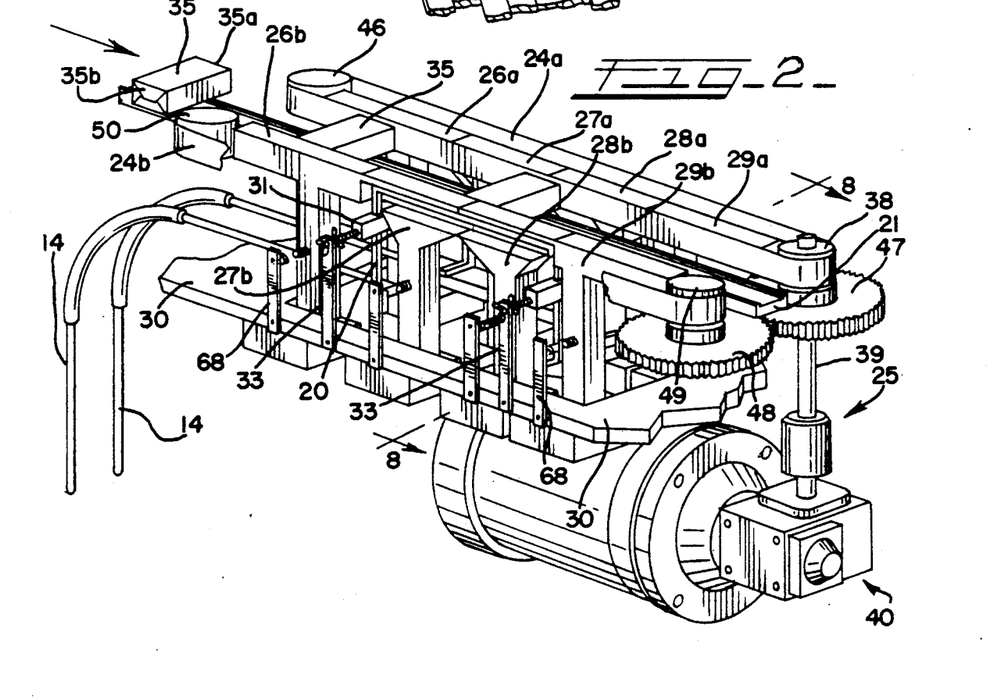
FIG. 2 is a perspective view of an apparatus for sealing a package made in accordance with the teachings of the present invention.

FIG. 2 shows the induction sealing and conveyor unit 10 in more detail. It generally includes an induction coil 20, package support bar 21, counter-rotating conveyor belts 24a, 24b, conveyor motor and drive train 25, paired platens (26a, 26b; 27a, 27b; 28a, 28b; and 29a, 29b) and base 30. As will be further described hereafter, packages 35 to be sealed are fed along the package support bar 21 between the conveyor belts 24a, 24b. The sides 35a, 35b of the packages 35 to be sealed are held between the belts.

Figures 2A, 2B, 2C, 2D, 2E:
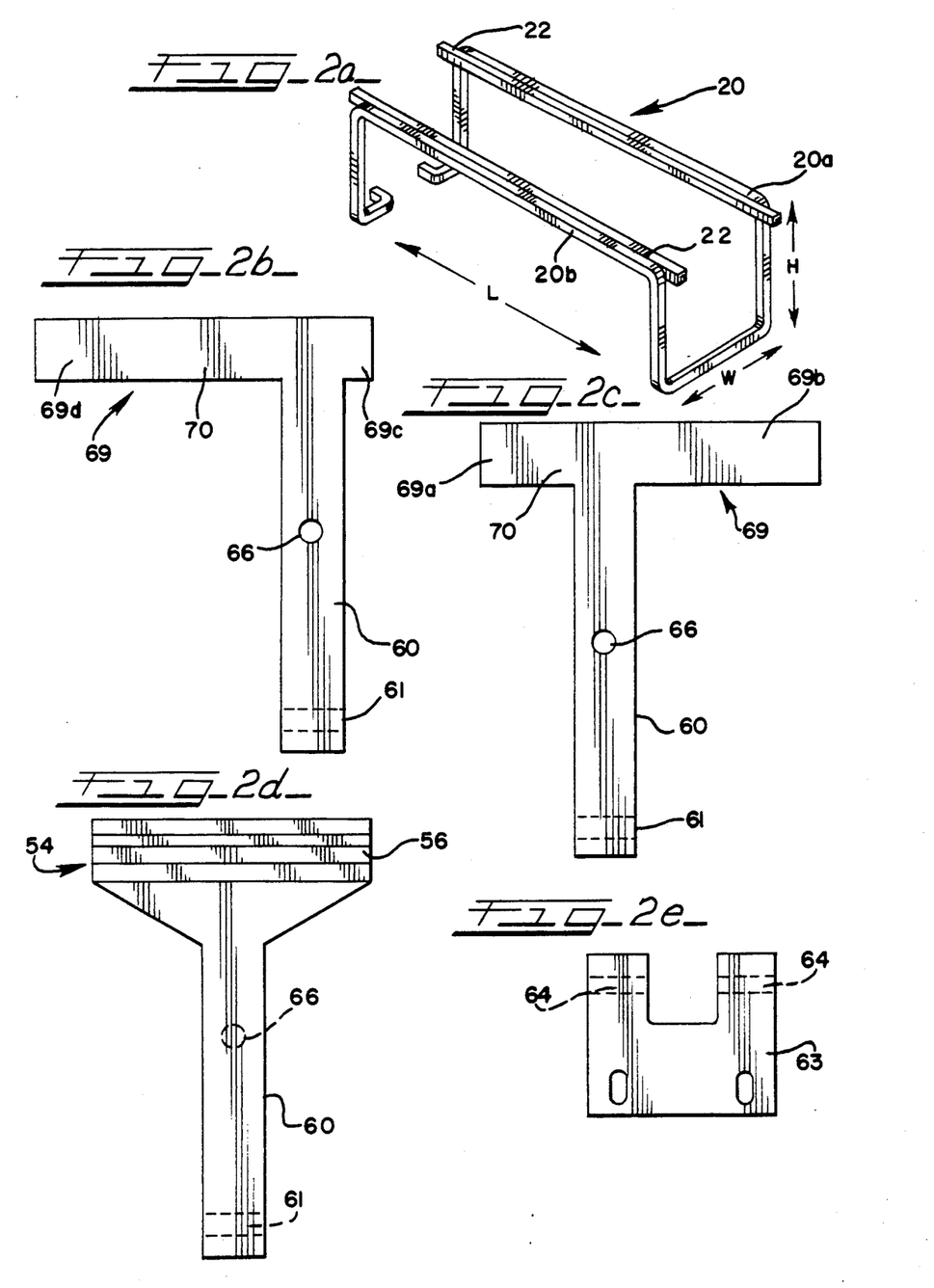
FIG. 2a is a perspective view of the induction coil used in this embodiment.
FIG. 2b is an elevational view of a pressure-applying platen.
FIG. 2c is an elevational view of another pressure-applying platen.
FIG. 2d is an elevational view of yet another pressure-applying platen.
FIG. 2e is a plan view of a platen mount.

The induction coil 20 is best shown in FIG. 2a. It is made of one-quarter inch square brass tubing formed into a continuous loop. The loop has straight portions 20a, 20b which are located on opposite sides of the conveyor bar 21. The coil is approximately 10 inches in length (L) about 3 and ¼ inches in width (W) and about 4 and ¼ inches in height (H).

A straight length 22 of the same tubing is braised to the inboard side of each of the straight portions 20a, 20b. This straight length of tubing 22 serves to concentrate the induction field in this area of the coil 20, also making the field more uniform for sealing. Extending these straight lengths 22 beyond the ends of the coil straight portions 20a, 20b further "straightens" the field at these corners of the coil.

Figure 8:
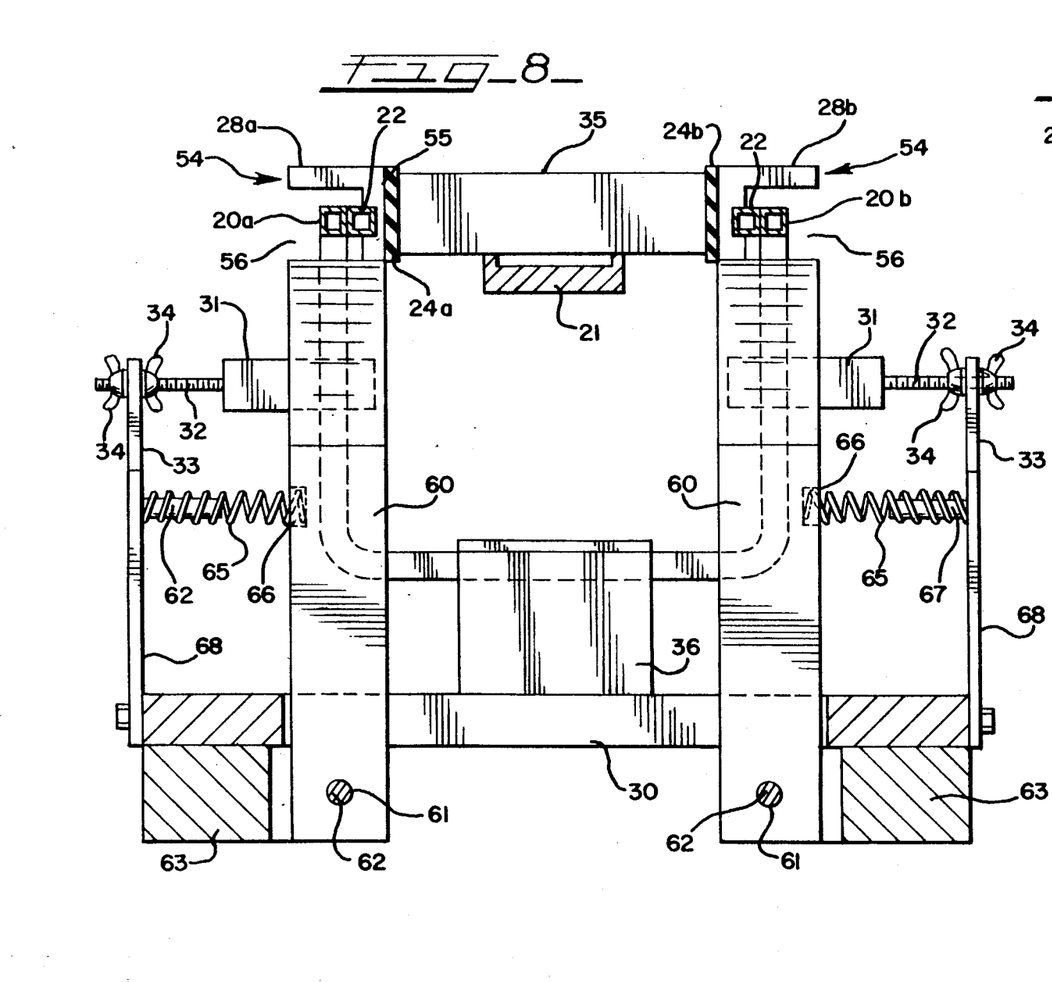
FIG. 8 is a sectional view along line 8—8 of FIG. 2.
Figure 9:
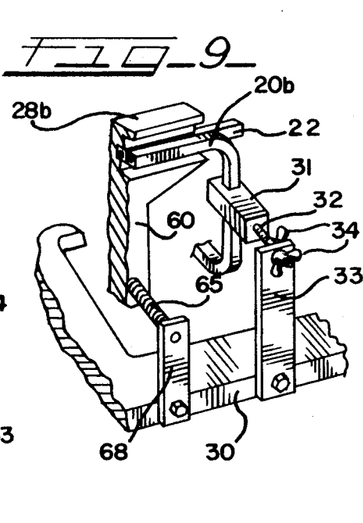
FIG. 9 is a reduced-scale elevational view of the coil mount shown in FIG. 8, with parts broken away for detail.

The coil 20 is mounted on the base 30 via insulative block-like clamps or brackets 31 (FIGS. 8 and 9). A brass threaded stud 32 is securely fixed to each bracket 31, and passes through a bore formed in a mounting post 33 fixed to base 30. Wing nuts 34 are threaded on the stud ends on each side of the post 33. Minor adjustments in the position of the coil 20 can thereby be made by moving the studs via the wing nuts. The brackets 31 are made of Delrin. An additional insulative bracket 36 is further provided to support the lower end of the coil 20.

The belts 24a, 24b are commercially available multiple-ply polyester food-grade belts which are 0.06 inch thick and 1 inch wide. One end of belt 24a is mounted on a rimmed cylindrical block or drive pulley 38 fixed concentric with a drive shaft 39. The other end of belt 24a is mounted on an idler pulley 46, which is mounted to freely rotate on a shaft (not shown). Drive shaft 39 is in turn rotated about its axis via a conveyor drive motor assembly 40. The drive motor assembly 40 used herein is a ¼ HP constant torque adjustable speed electric motor manufactured by The Dayton Electric Mfg. Co. of Chicago, Ill. Its variable speed drive connects through a 56C mounting face to a right angle speed reduction drive including a single reduction worm gear for a 20:1 reduction ratio. A 115 volt, 60/50 Hz controller is used.

A toothed drive spur gear 47 is also fixed concentric with the drive shaft 39. Drive gear 47 meshes with a toothed follower gear 48, which is mounted to turn on a shaft (not shown). One end of belt 24b is mounted on a pulley 49, which in turn is mounted concentric with gear 48. The other end of belt 24b is mounted on an idler pulley 50, which is mounted to freely rotate on a shaft (not shown). The idler pulley 50 rotates on a needle bearing on a hardened (turned, ground and polished) shaft mounted to an Efson linear tensioner (or the like).

The latter constantly adjusts the tension in the belt to compensate for stretching. Drive gear 47 thus turns follower gear 48, thereby rotating pulley 49 to drive belt 24b. Since the pulleys and gears on opposite sides of the drive path are substantially identical, the belts are thereby driven at the same linear velocity, although in opposite directions (i.e., counter-rotating). A package 35 can therefore be held in place along opposed sides 35a, 35b between the moving belts 24a, 24b and moved along the package support bar 21.

A series of paired platens (26a, 26b; 27a, 27b; 28a, 28b; and 29a, 29b) are used to adjust the pressure applied against the sides 35a, 35b of the package to be sealed along various portions of the conveyor path. These pressure bars are arranged such that one pair (26a, 26b) is used on the package sides before it passes the coil 20 (i.e., the area of inductive heating) Another pair (29a, 29b) is used after the package 35 has passed through the coil 20. The remaining two pair (27a, 27b; 28a, 28b) are used in the area of inductive heating.

The unique advantage of these four pair of independently adjustable platens can now be seen. For example, it may be desirable to apply just a slight force to the packages sides before entry into the area of induction heating, to thereby assure that the package sides remain closed and the folds square. Upon entering the area of the coil, a very minimal force may be desired against the sides in the first instance, then increasing in the area of the middle to end of the heating zone. Finally, a relatively large pressure may be required after heating has activated the adhesive material on the overlapped portions of the package sides to close and seal the portions tightly together.

The two pair of platens in the area of the coil 20, (pairs 27a, 27b and 28a, 28b), are substantially identical to each other (FIG. 2d). Each is T-shaped in form, having a head portion or pressure bar 54 including a face 55 (FIG. 8) which bears against the inboard run of a belt. The area behind the pressure face 55 is hollowed out to form a channel 56 within which a portion (20a or 20b) of the coil 20 is received, along with the straight tubing lengths 22.

All of the platens are made of Delrin, which is a fairly rigid thermoplastic that is substantially transparent to the induction field generated at the coil 20. Delrin has a high modulus of elasticity (about 900,000 lbs./sq. in.), which reduces its deflection in the form of these platens. This is particularly significant insofar as the two pair of platens having the channels 56. Because the wall forming the pressure face 55 of the platens is between the belt and the coil, it is cut very thin to allow the coil to be as close as possible to the pressure face (and hence the package side), without touching the platen. It is not desired to have the coil touch the platen, since this would then influence the force exerted on the package end in a relatively uncontrolled manner.

In this embodiment, the inboard edge of coil 20 is preferably located in a range of about 5/16 inch to 7/16 inch from the package side to be sealed.

A body portion 60 extends downwardly from the pressure bar 54, and is the trunk of the T-shaped platen. A taper (of about 30 degrees from the horizontal) is provided from the bottom lateral edge of the pressure bar 54 (the top of the T) into the body portion 60 (the trunk of the T).

Platens 26a, 26b, 29a and 29b are similar to each other (FIGS. 2b and 2c). Each also has a T-shape, with a pressure bar 69 including a face 70 that bears against the inboard run of the adjacent belt, and a body portion 60. Unlike the previously described platens, the pressure bars 69 are solid, having no channel formed therein, since these pressure bars are located upstream or downstream from the induction coil 20.

Pressure bar 69 forms the top of these T-shaped platens. In the upstream pair of platens (26a, 26b), one side 69a of the pressure bar 69 extends about two inches laterally from the one-inch wide base portion 60, while the opposite side 69b extends about three inches outwardly from the face. The downstream pair of platens (29a, 29b) have pressure bar sides which extend one-half inch (69c) and four inches (69d), respectively, from the one-inch wide base portion. When mounted, the longer side of each pressure bar 69 extends away from the coil 20. No taper is provided between the bottom of the pressure bar 69 and its base portion 60, since there is no channel in the pressure bar needing reinforcement, as in the pressure bar pairs surrounding the coil 20. Although the foregoing pressure bars extend different lengths from the base portions 60, there is no particular significance placed on this feature.

Each of the pressure bars disclosed herein is identically mounted. At the base of each body portion 60 is a throughbore 61. A stationary stud 62 (FIG. 8) extends through throughbore 61, and fixes the base of body portion 60 within a pivot mount 63 (FIG. 2e). The pivot mount 63 has a U-shape, with the base of the body portion 60 being received within the U. The stud 62 extends within aligned throughbores 64 formed in the arms of the U of the pivot mount 63. Oil impregnated bronze brushings on the stud (not shown) complete the pivot mounting for the platens. The pivot mount 63 is itself fixed to the base 30. The pressure bar can thus freely pivot toward and away from the conveyor path.

Each pressure bar is biased toward the conveyor path, and against the adjacent belt portion, by a helical compression spring 65. One end of spring 65 is received within a well 66 formed in the outboard side of each body portion 60 of the platens. The platens illustrated in FIGS. 2b and 2c also have a well formed in the opposite side of the body portion, making the same platen useable on either side of the conveyor path. The other end of the spring 65 is received on a post 67 that extends from a bracket 68. Bracket 68 is fixed to the base 30.

Each platen and its respective spring bracket 68 are arranged so that the spring 65 is placed under a desired compression when the spring 65 is inserted into place. The force of the pressure face against the adjacent belt portion can be adjusted by substituting springs with different spring rates or by using shims between the spring 65 and the bracket 68, to name but two ways of adjustment.

FIGS. 3–7 illustrate the special wrapper developed for induction sealing in accordance with the present invention. The wrapper 80 is a laminate and as will be seen hereafter, is readily made in the form of an infinite web that is cut into rolls, and then cut into individual wrappers for forming packages for stacks of chewing gum sticks 81.

Figures 3, 4, 5, 6, 7:
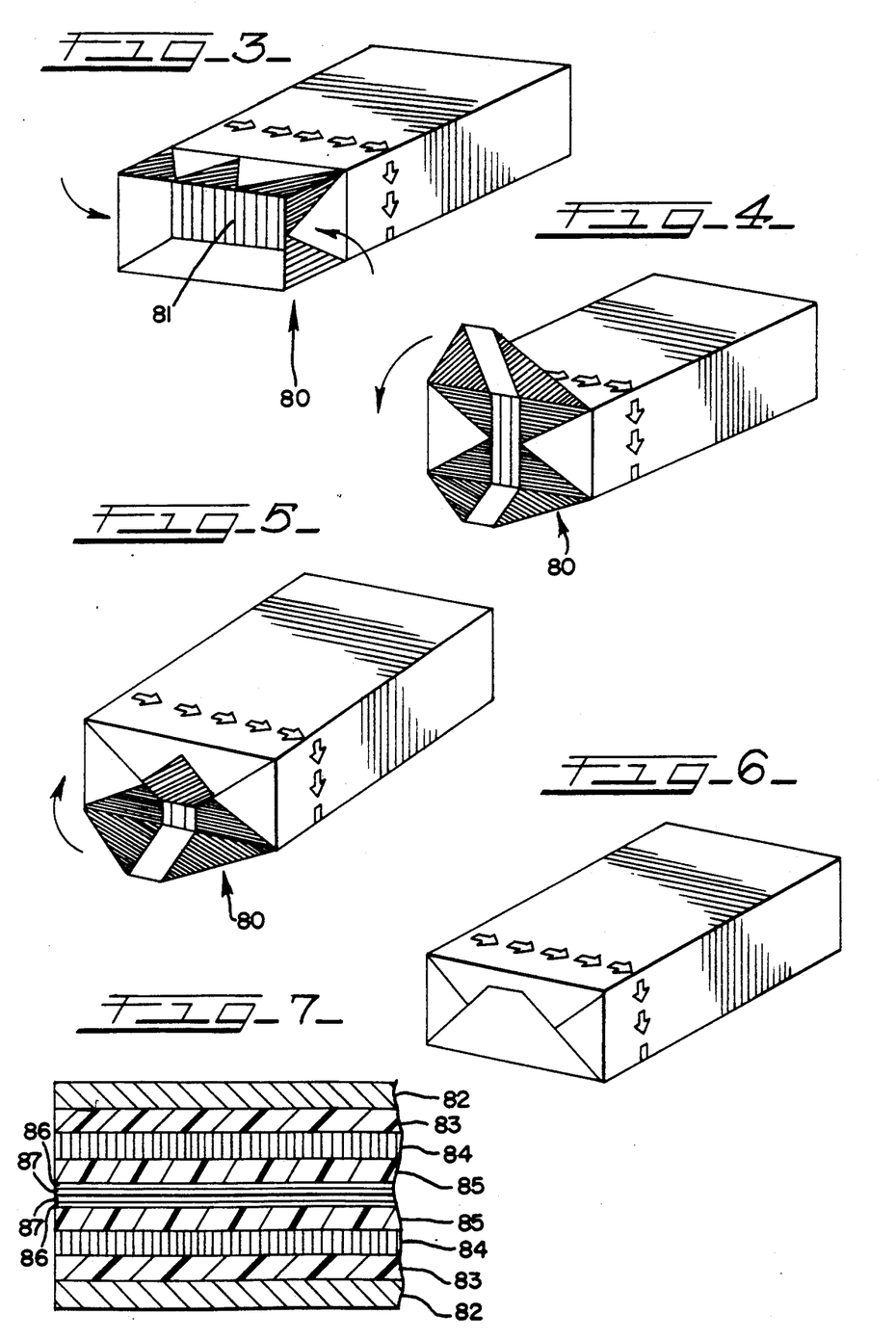
FIGS. 3 through 6 show one manner in which the sides of a package to be sealed are folded.
FIG. 7 is a schematic illustration of layers of a wrapper made in accordance with the teachings of this invention in overlapped arrangement along a side to be sealed.

FIG. 7 illustrates, in schematic form, a cross-section of such a wrapper folded upon itself, as it would be in overlying flap-portions on sides of the package to be sealed. Layer 82 of the laminate is aluminum foil about 0.0003 inches thick. Layer 82 would be most inboard relative to the wrapped package (i.e., most adjacent the gum sticks). The aluminum foil layer is susceptible to eddy currents induced by coil 20 and is of sufficient thickness to generate the heat necessary to melt the adhesive material used to seal overlapped flap-portions together, as will be described hereafter.

The next layer of the laminate is a layer of a polyolefin, here polyethylene 83 in about 7.2 lbs./ream. The aluminum layer 82 is extrusion laminated with the polyethylene layer 83.

A layer of paper 84 follows in about 30 lbs./ream, with a layer of another polyolefin, here polypropylene 85 in about 12 lbs./ream on the paper layer 84.

A layer of printing ink 86 is on the polypropylene layer 85 in the amount of about 3.8 lbs./ream. The wrapper described to this point is standard, and its fabrication is well known.

The inventive wrapper next includes a layer of a thermoplastic material 87 in about 1.5–20 lbs./ream, which will become flowable upon heating and thereby serve as an adhesive between overlapped flap-portions of the package. The thermoplastic 87 used herein is a solvent-based heat seal lacquer obtained from Morton Thiokol, and sold under the name Adcote 33 D.W. 1560.

The lacquer layer 87 is deposited in bands (FIG. 3) on the printing ink layer 86 by Gravure printing the lacquer thereon. A diamond-shaped printing pattern is used, which, when a large web is cut into wrapper TM-width sized rolls, becomes a saw-tooth pattern along the side edges of the wrappers.

The folding sequence for closing a package side is illustrated in FIGS. 3–6. A midline seal of the individual wrappers around a stack is accomplished in a conventional manner. As shown, overlying flaps place substantial portions of the lacquer layer 87 in facial engagement with each other.

The folded packages 35 are fed seriatim into the sealing and conveyor unit assembly 10 with the closed sides 35a, 35b held between the counter-rotating belts 24a, 24b. Under the influence of sufficient heat conducted from the induced-resistance heating of the aluminum layer 82, the lacquer becomes flowable and seeps through the printing ink layer 86 to the polypropylene layer 85 below. The thermoplastic lacquer bonds to the underlying polypropylene layer, as well as to itself, to seal the overlying flaps together.

Thus, while the invention has been described with reference to a certain embodiment, those skilled in this art will recognize modifications of structure, arrangement, composition and the like that can be made to the present invention, yet will still fall within the scope of the invention as hereafter claimed.

What is claimed is:

1. Apparatus for sealing opposite sides of a package wherein each side has portions folded upon each other with a thermoplastic material between overlapping folded portions, comprising:

a conveyor for conveying the package along a path of travel with the sides of the package to be sealed facing perpendicular to the path of travel, said conveyor including a pair of counter-rotating belts on opposite sides of said path of travel which contact respective sides of the package to be sealed such that the package is compressed between said belts, means for inducing a heat-producing eddy current sufficient to cause the thermoplastic material to become flowable and adhere overlapped folded portions together, said means for inducing a heat-producing eddy current including and induction coil having portions located adjacent and on respective sides of said path of travel in opposite relationship to said sides to be sealed such that each said package end to be sealed passes closely by an induction coil portion, and further including an induction sensitive material associated with said package side to be sealed, means for applying pressure to each of said belts along a portion of said path of travel wherein said thermoplastic material becomes flowable under action from said means for inducing a heat-producing eddy current, to thereby press said overlapped portions together, said means for applying pressure including a first pair of platen members which are not susceptible to said eddy current, said pair of platen members being opposed on respective sides of said path of travel and located between said belt and said induction coil portion on each side of said path of travel, and further including an adjustable biasing means for urging said platen member against said belt to apply a desired pressure on said belt to effect a desired pressure of said belts against said package ends to be sealed, each said platen member has a head portion having a pressure face which engages said belt and a hollow located behind said face within which said induction coil is received, and a body portion extending from said head portion, with pivot means for mounting said body portion to permit said head portion to freely move toward and away from said belt, said adjustable biasing means further comprising a spring mounted to bias said body portion toward said belt.

2. The apparatus of claim 1 further including a second pair of said platen members located next to said first pair, each said platen member in said second pair having a head portion having a pressure face which engages said belt and a hollow located behind said face within which said induction coil is received, and a body portion extending from said head portion, with pivot means for mounting said body portion to permit said head portion to freely move toward and away from said belt, said adjustable biasing means further comprising a spring mounted to bias said body portion toward said belt.

3. The apparatus of claim 2 further including a third pair of platen members located upstream from said first and second pairs of platen members along a portion of said path of travel whereat said means for inducing a heat-producing eddy current will not significantly affect said thermoplastic material, said third pair of platen members each having a head portion having a pressure face which engages said belt and a body portion extending from said head portion, with pivot means for mounting said body portion to permit said head portion to freely move toward and away from said belt, said adjustable biasing means further comprising a spring mounted to bias said body portion toward said belt.

4. The apparatus of claim 3 further including a fourth pair of platen members located downstream from said first and second pairs of platen members along a portion of said path of travel whereat said means for inducing a heat-producing eddy current will not significantly affect said thermoplastic material, said fourth pair of platen members each having a head portion having a pressure face which engages said belt and a body portion extending from said head portion, with pivot means for mounting said body portion to permit said head portion to freely move toward and away from said belt, said adjustable biasing means further comprising a spring mounted to bias said body portion toward said belt.

5. Apparatus for sealing opposite sides of a package formed from a laminate wrapping material wherein each side has portions of the laminate folded upon each other with a thermoplastic material applied to an outside layer of the laminate located between overlapping folded portions, the laminate material including a metal foil layer, comprising:

a conveyor for conveying the package along a path of travel with the sides of the package to be sealed facing perpendicular to the path of travel, said conveyor including a pair of counter-rotating belts on opposite sides of said path of travel which contact respective sides of the package to be sealed such that the package is compressed between said belts and conveyed therebetween, means for inducing a heat-producing eddy current in said metal foil sufficient to cause the thermoplastic material to became flowable and adhere overlapped folded portions together, said means for inducing a heat-producing eddy current including an induction coil having portions located adjacent and on respective sides of said path of travel in opposed relationship to said sides to be sealed such that each said package end to be sealed passes closely by an induction coil portion, means for adjustably mounting said induction coil for movement relative to said belts, first and second pairs of platen members which are not susceptible to said eddy current, each of said first and second pair of platen members being opposed on respective sides of said path of travel and located between said belt and said induction coil on Each side of said path of travel, said first and second pair of said platen members located next to one another, a third pair of platen members located upstream from said first and second pairs of platen members along a portion of said path of travel whereat said means for inducing a heat-producing eddy current will not significantly affect said thermoplastic material, said platen members of said third pair being opposed on respective sides of said path of travel, a fourth pair of platen members located downstream from said first and second pairs of platen members along a portion of said path of travel whereat said means for inducing a heat-producing eddy current will not significantly affect said thermoplastic material, said platen members of said fourth pair being opposed on respective sides of said path of travel, and separate adjustable biasing means for urging each said member against said belt to apply a desired pressure on said belt to effect a desired pressure of said belts against said package ends to be sealed, means for independently adjusting each of said pairs of platen members to effect desired pressures on the ends to be sealed before, during and after heating of the thermoplastic material.

6. The apparatus of claim 5 wherein said platen members of said first and second pairs each has a head portion having a pressure face which engages said belt and a hollow located behind said face within which said induction coil is received, and a body portion extending from said head portion, with pivot means for mounting said body portions of said first and second platen member pairs to permit its head portion to freely move toward and away from said belt, and wherein said platen members of said third and fourth pairs each has a head portion having a pressure face which engages said belt and a body portion extending from said head portion, with pivot means for mounting said body portions of said third and fourth platen member pairs to permit its head portion to move toward and away from said belt, said adjustable biasing means further comprising a spring mounted to by each said body portion toward said belt.

7. Apparatus for sealing opposite sides of a package wherein each side has portions folded upon each other with a thermoplastic material between overlapping folded portions, comprising:

a conveyor for conveying the package along a path of travel with the sides of the package to be sealed facing perpendicular to the path of travel, said conveyor including a pair of counter-rotating belts on opposite sides of said path of travel which contact the sides of the package to be sealed such that the package is compressed between said belts, a induction coil for inducing a heat-producing eddy current sufficient to cause the thermoplastic material to become flowable and adhere overlapped folded portions together, said induction coil having at least an elongated portion thereof located closely adjacent to and extending along part of each side of said path of travel such that said package ends to be sealed pass closely by said induction coil elongated portions, a plurality of paired opposed platen member for applying pressure to said belts along said path of travel to thereby press said overlapped portions together, each said platen member having a head portion with a pressure face which engages said belt and a body portion extending perpendicular to said head portion, said platen member not being susceptible to said eddy current, each said platen member in a pair being located between said belt and said induction coil portion and having its platen bear against a belt, each said member in a pair further including an adjustable biasing means for independently urging said member against said belt to apply a desired pressure on said belt to effect a desired pressure of said belt against said package end to be sealed, and a pivot mount for each said body portion which permits free movement of said head member toward and away from said belt.

8. The apparatus of claim 7 further including means for adjustably mounting said induction coil to permit said induction coil elongated portions to be moved relative to said belts.

9. The apparatus of claim 8 wherein at least one pair of said platen members has a channel found in each respective head portion, each said channel having an inboard sidewall terminating closely adjacent said pressure face, said induction coil elongated portion being received within said channel and being mounted closely adjacent but not contacting said inboard sidewall.

* * * * *